US012151776B2

(12) United States Patent
Kerschbaumer (10) Patent No.: US 12,151,776 B2
(45) Date of Patent: Nov. 26, 2024

(54) ROTATIONAL BRAKING METHODS AND APPARATUSES (71) Applicant: Michael Robert Kerschbaumer, New York, NY (US)

(72) Inventor: Michael Robert Kerschbaumer, New York, NY (US)

(*) Notice: Subject to any disclaimer, the term of this patent is extended or adjusted under 35 U.S.C. 154(b) by 572 days.

(21) Appl. No.: 17/291,156

(22) PCT Filed: Nov. 1, 2019

(86) PCT No.: PCT/US2019/059340
§ 371 (c)(1),
(2) Date: May 4, 2021

(87) PCT Pub. No.: WO2020/096883
PCT Pub. Date: May 14, 2020

(65) Prior Publication Data
US 2022/0073168 A1 Mar. 10, 2022

(51) Int. Cl.
*B62L 3/02* (2006.01)
(52) U.S. Cl.
CPC .............. *B62L 3/026* (2013.01); *B62L 3/023* (2013.01)
(58) Field of Classification Search
CPC .......... B62L 3/023; B62L 3/026; B62K 21/12
See application file for complete search history.

(56) References Cited

U.S. PATENT DOCUMENTS

| 4,286,699 A * | 9/1981 | Pawelka | B62L 3/026 74/504 |
| 4,607,733 A * | 8/1986 | Dodge | B62L 3/023 74/489 |
| 4,653,613 A * | 3/1987 | Blancas | B62L 3/026 188/24.11 |
| 5,437,206 A * | 8/1995 | Boor | B62L 3/026 74/489 |
| 9,567,034 B2 | 2/2017 | Sirbu | |
| 2005/0285369 A1* | 12/2005 | Jiun Gu | B62K 23/04 280/288.4 |
| 2007/0266817 A1 | 11/2007 | Lassiter | |
| 2015/0057904 A1 | 2/2015 | Nishimura | |
| 2016/0318575 A1 | 11/2016 | Shimoda | |

(Continued)

FOREIGN PATENT DOCUMENTS

| CN | 2052385 U | 2/1990 |
| CN | 2145748 | 11/1993 |

(Continued)

OTHER PUBLICATIONS

International Search Report and Written Opinion dated Feb. 25, 2020 for International Application PCT/US19/59340 filed Nov. 1, 2019 (9 pages).

(Continued)

*Primary Examiner* — Vishal R Sahni
(74) *Attorney, Agent, or Firm* — Dentons US LLP (57) ABSTRACT Various technologies for reducing a speed of land vehicle by rotating its handle bar. A device comprises: a handlebar having a longitudinal axis; a seat coupled to the handle bar; a line coupled to the seat; and a brake coupled to the line, wherein the handlebar is rotatable about the longitudinal axis such that the seat moves and thereby controls the brake via the line.

14 Claims, 3 Drawing Sheets (56) References Cited

U.S. PATENT DOCUMENTS

| | | |
|---|---|---|
| 2016/0318578 A1 | 11/2016 | Heber et al. |
| 2017/0101081 A1 | 4/2017 | Meier |
| 2017/0190335 A1 | 7/2017 | Gillett |
| 2018/0201338 A1 | 7/2018 | Henry |
| 2018/0229697 A1* | 8/2018 | Ostini .................... B62B 9/085 |
| 2019/0375480 A1 | 12/2019 | Pankratz |
| 2022/0073168 A1 | 3/2022 | Kerschbaumer |

FOREIGN PATENT DOCUMENTS

| | | | |
|---|---|---|---|
| CN | 2521135 | 11/2002 | |
| CN | 107117246 | 7/2019 | |
| DE | 202010010459 | 10/2010 | |
| DE | 102010053009 | 6/2012 | |
| DE | 102010053009 A1 * | 6/2012 | ............. B60T 11/16 |
| DE | 202014008869 | 1/2015 | |
| KR | 202008005038 | 10/2008 | |
| KR | 20100012067 | 2/2010 | |
| WO | WO-9014974 A2 * | 12/1990 | |
| WO | WO199014974 | 12/1990 | |
| WO | WO1990014972 | 12/1990 | |
| WO | WO2013000780 | 1/2013 | |
| WO | WO2016042431 | 3/2016 | |
| WO | WO2018154209 | 8/2018 | |
| WO | WO2020096883 | 5/2020 | |
| WO | WO2020227348 | 11/2020 | |

OTHER PUBLICATIONS

International Search Report and Written Opinion dated Aug. 20, 2020 in related application PCT/US20/31576 filed May 6, 2020 (8 pages).

* cited by examiner

ROTATIONAL BRAKING METHODS AND APPARATUSES

CROSS REFERENCE TO RELATED APPLICATIONS

This patent application claims a benefit of priority to PCT International Application PCT/US19/059340 filed 1 Nov. 2019; which claims a benefit of U.S. Provisional Patent Application No. 62/756,656 filed 7 Nov. 2018; each of which is incorporated herein in its entirety for all purposes.

TECHNICAL FIELD

This disclosure pertains to various methods and various apparatuses for controlling various braking mechanisms for various land vehicles, such as bicycles, motorcycles, scooters, or others.

BACKGROUND

Currently, bicycle hand-braking systems rely on levers, which actuate the bicycle's cable or a hydraulic braking system. When actuated, the brake lever utilizes the movement of a cable or a hydraulic fluid to transfer a mechanical force or energy to the rest of the braking system. In response, the braking system actuates the brake pads configured to exert force upon (e.g., squeeze) a rim of a bicycle wheel, tire, drum, hub or brake disc. Conventionally, the brake cables or the hydraulic braking system are actuated using brake levers installed on or near the bicycle's handlebar. However, these approaches do have a few inefficiencies. For instance, actuating the brake levers has been proven difficult for riders with small or weak hands (e.g., children or the elderly).

SUMMARY

In an embodiment, a device comprises: a bicycle or other vehicle including a handlebar, a cable seat or pushrod mount, and a brake, wherein the cable seat or pushrod mount is coupled to the handlebar, wherein the handlebar is rotatable such that the cable seat or pushrod mount move and thereby exert a force through a cable, rod, or hydraulics (or pneumatics) to a braking mechanism, such as a caliper brake, band brake, drum brake, hub brake, cantilever brake, V-brake, roller brake or disc brake for slowing the bicycle or other vehicle.

DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

DETAILED DESCRIPTION OF PREFERRED EMBODIMENTS

This disclosure is now described more fully with reference to the set of accompanying illustrative drawings, in which example embodiments of this disclosure are shown. This disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

Generally, this disclosure pertains to various methods and various apparatuses for controlling various braking mechanism for various land vehicles, such as bicycles, motor cycles, scooters, or others. As noted above, conventional solutions to some abovementioned problems have proven to be less than satisfactory. Therefore, this disclosure enables a handlebar configured to rotate (e.g., about longitudinal axis thereof) and thereby use a rotational force to actuate a braking system of a vehicle. This solution provides a mechanical advantage and a user (e.g., rider) may use both hands, both wrists, and both forearms to rotate the handlebar instead of just a few fingers. Therefore, the mechanical advantage is significantly increased, and both front and rear brakes can be actuated using the mechanical force transferred from the rotating handlebar independently or jointly. The embodiments disclosed herein also allow the force to be applied to the front or rear wheel, in accordance with a predetermined proportion.

Furthermore, a few have attempted to utilize pedal brakes for riders with limited physical abilities by capitalizing on the larger muscles in the legs. However, pedal brakes can only actuate the rear wheel's braking system. And given that 75% of the braking power on a bicycle is generated using the front wheel, the above-mentioned solution is not ideal. On the other hand, the methods and apparatus disclosed herein allow riders to use the larger and stronger forearm muscles to create a better and more efficient braking power. Furthermore, children's kick bicycles do not have pedals making these bicycles unable to utilize a pedal brake and no brake levers as their fingers are not strong enough The methods and apparatuses disclosed herein are also safer as the fingers do not need to be moved from the grip to the lever, thus improving the rider's reaction time. Furthermore, keeping one's hands on the handlebar helps maintain control, especially over bumpy or off-road conditions.

Figure 1:
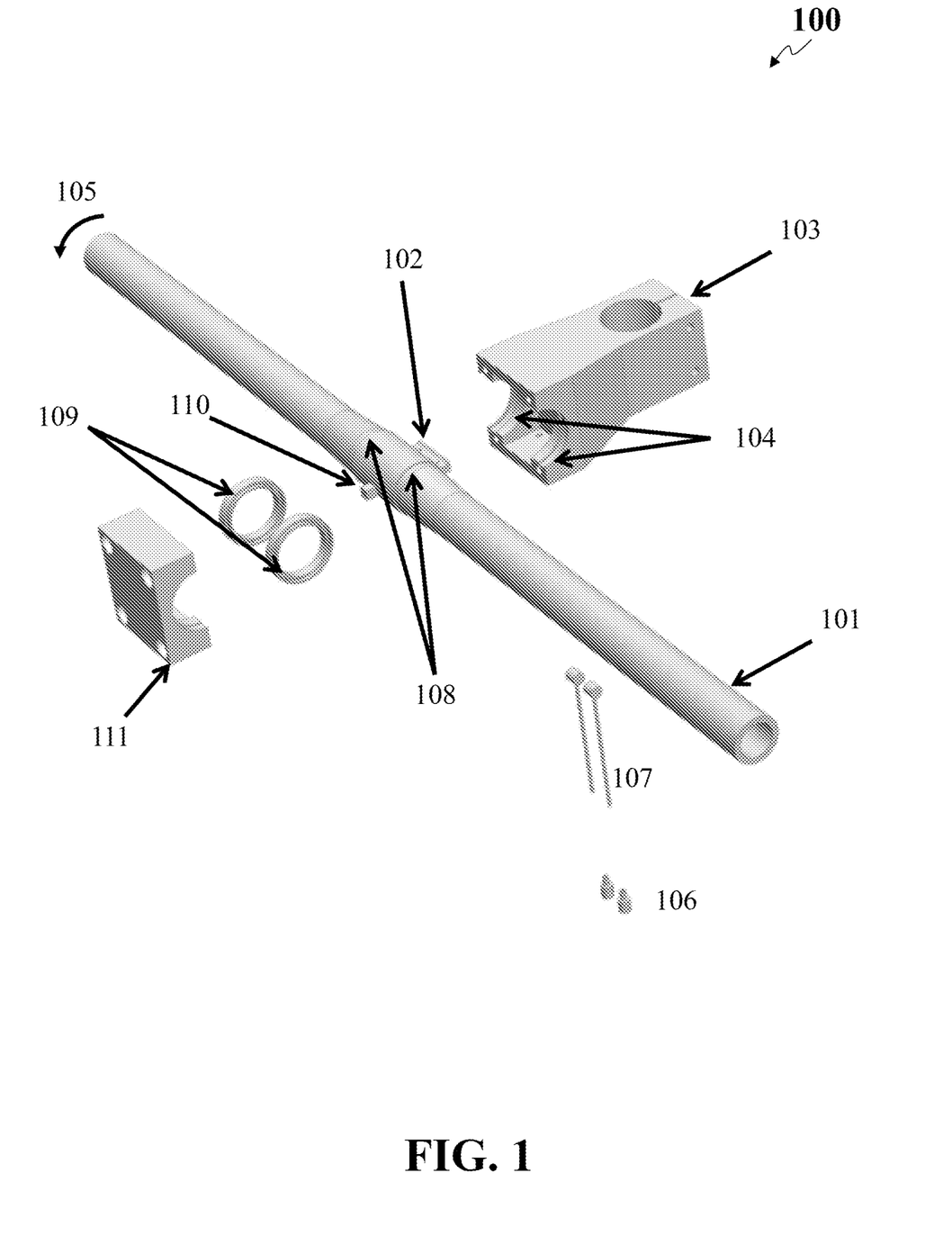
FIG. 1 illustrates an exploded view of a rotational hand brake, in accordance with an embodiment.

FIG. 1 illustrates an exploded view of a rotational hand brake, in accordance with an embodiment. FIG. 1 illustrates the operational steps for manually actuating a braking system 100 in accordance with an embodiment. As illustrated in FIG. 1 braking system 100 may include handlebar 101, cable seat 102, stem 103, bearing outer race 104, braking rotation 105, cable ferrules 106, brake cables 107 (or another form of flexible or rigid line), bearing inner race 108, bearings 109, bar stop 110, and stem face plate 111. The handlebar 101 has a longitudinally axis (rotation or symmetry) and the handlebar 101 is user rotatable along the horizontal axis along the braking rotation 105 and back or vice versa.

In operation, and using a non-limiting example, an operator (e.g., a rider) may use one or more components described in FIG. 1 to actuate the braking system 100 of a bicycle or another moving vehicle. For instance, a rider may rotate the handlebar 101, in the direction of the braking rotation 105 along the longitudinal axis of the handlebar 101, thereby rotating the cable seat 102 in a rotational manner consistent with the braking rotation 105. The cable seat 102 may be a tab or otherwise a protrusion or receptacle that is attached with or otherwise operationally coupled with the handlebar 101, as shown in the braking system 100.

The cable seat 102 may rotate the same amounts as the handlebar 101. For instance, the speed and the rotational amount of movement of cable seat 102 may be directly proportional to the speed and the rotational amount of the handlebar 101 when rotating about the longitudinal axis of the handlebar 101. In some other embodiments, the speed and the rotational amount of the cable seat 102 may not be directly proportional to the speed and the rotational amount of the handlebar 101. In some configurations, cable seat 102 may rotate at a speed or by an amount that is not equal to the handlebar 101.

Furthermore, the rotation of the cable seat 102 may also be restricted by the stem 103 in which the cable seat 102 is housed. For example, upper and lower portions of the stem 103 may dictate how much the cable seat 102 can rotate in clockwise and/or counterclockwise directions about the longitudinal axis of the handlebar 101.

In some configurations, the cable seat 102 may include one or more openings (e.g., holes) that correspond to brake cables 107. For instance, brake cables 107 may penetrate the cable seat 102 in accordance with these openings. The size and configurations of these holes may be directly related to the amount of force exerted on to the brake cables 107. For instance, in a non-limiting example, the amount of force exerted on to a brake cable may be reduced proportionally as a result of said brake cable's distance from the center axis of the cable seat 102. Therefore, using differing brake cables penetrating through different openings at various distances, the braking system 100 may control the proportion of force exerted on to each brake cable. Using this method, braking system 100 may regulate or balance the force exerted on to the front wheel and the back wheel.

In some configurations, the braking system 100 may be operationally connected to a balancer or a regulator that transmits, e.g., exerts, a predetermined proportion of the force (exerted onto the handlebar 101) onto the front and the back wheel.

The stem 103 may also house brake cables 107 and cable ferrules 106. The cable seat 102 maybe operationally coupled with the brake cables 107 and/or cable ferrules 106. For example, moving the cable seat 102 may actuate the brake cables 107 housed in this stem 103. In operation, the brake cables 107 may transfer the mechanical force exerted by the operator (e.g. by rotating the handlebar 101 consistent with the braking rotation 105 when rotating about the longitudinal axis of the handlebar 101) and may move one or more brake pads, or otherwise actuate an existing brake system of the bicycle to reduce the speed of the bicycle.

The handle bar 101 may rotate inside the stem 103 via the bearings 109 when rotating about the longitudinal axis of the handlebar 101. For example, the bearings 109 maybe attached, installed, or otherwise operationally coupled to the handlebar 101 so that when the handlebar 101 is rotated, the bearings 109 may also consistently rotate. The bearings 109 may be connected to the handle bar 101 via the bearing inner race 108, such as a depressed or etched region, within the handlebar 101, matching the shape and size of the bearings 109 inner diameter. Similarity, the stem 103 may also house the bearing outer races 104. These components may constrain relative motion of the handlebar 101 to only the desired motion, and may reduce friction between the handle bar 101 and the stem 103. The bearing system disclosed above may also provide free rotational movement of the handle bar 101 around a fixed axis. In some embodiments, the braking system 100 may use a bushing mechanism instead (or it in addition to) the bearing system described above. A bushing, also known as a bush, is an independent plain bearing that is inserted into a housing to provide a bearing surface for rotary applications. In a non-limiting example a lever is used to translate the rotary force (e.g., the force applied to the handlebar 101) to a linear force and actuate the brake cables 107.

Handlebar 101 may also comprise a bar stop 110. The bar stop 110 may be a tab or otherwise a protrusion that is attached with or otherwise operationally coupled with the handlebar 101, as shown in the braking system 100. The bar stop 110 may come to rest against its counterpart a tab or otherwise a protrusion that is attached with or otherwise operationally coupled or engaging with the faceplate 111 or stem 103, as shown in the braking system 100. The bar stop 110 may rotate the same amounts as the handlebar 101 when rotating about the longitudinal axis of the handlebar 101. For instance, the speed and the rotational amount of movement of bar stop 110 may be directly proportional to the speed and the rotational amount of the handlebar 101. In some other embodiments, the speed and the rotational amount of the bar stop 110 may not be directly proportional to the speed and the rotational amount of the handlebar 101. In some configurations, bar stop 110 may rotate at a speed or by an amount that is not equal to the handlebar 101. Furthermore, the rotation of the bar stop 110 may also be restricted by the stem face 111 or stem 103. For example, upper and lower portions of the stem face 111 may dictate how much the bar stop 110 can rotate in clockwise and/or counterclockwise directions. The bar stop 110 ensures that the handlebar 101 does not rotate beyond a predetermined rotational range when rotating about the longitudinal axis of the handlebar 101. In some configurations, the predetermined rotational range of the handle bar 101 may be adjustable by the operator via adjusting a corresponding stop in the stem faceplate 111 or stem 103.

Figure 2:
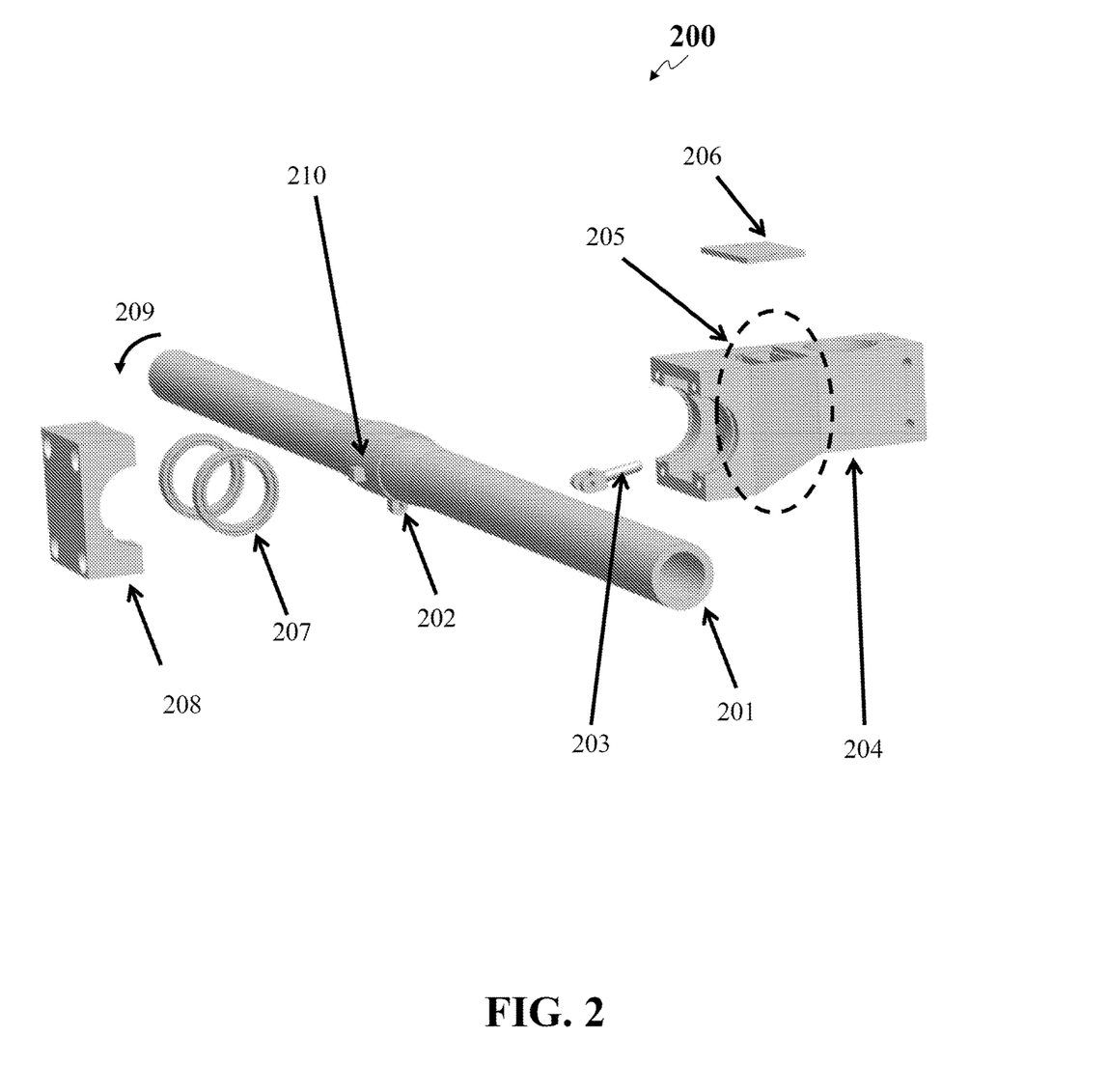
FIG. 2 illustrates an exploded view of a rotational hand brake, in accordance with an embodiment.

FIG. 2 illustrates an exploded view of a rotational hand brake, in accordance with an embodiment. FIG. 2 illustrates the operational steps for actuating a braking system 200, using hydraulic force, in accordance with an embodiment. However, note that a pneumatic system can be as well, whether additionally or alternatively. As illustrated in FIG. 2 braking system 200 may include handle bar 201, push rod mount 202, push rod 203, stem 204 with master cylinder with internal fluid reservoir 205, reservoir cover 206, bearings 207, stem face plate 208, braking rotation 209, and bar stop 210. The handlebar 201 has a longitudinally axis (rotation or symmetry) and the handlebar 201 is user rotatable along the horizontal axis along the braking rotation 209 and back or vice versa.

In operation, and using a non-limiting example, an operator (e.g., a rider) may use one or more components described in FIG. 2 to actuate a hydraulic (or pneumatic) braking system of a bicycle or another vehicle. For instance, a rider may rotate the handlebar 201 when rotating about the longitudinal axis of the handlebar 201, in the direction of the braking rotation 209, thereby rotating the pushrod mount 202 in a rotational manner consistent with the braking rotation 209. The pushrod mount 202 may be a tab or a protrusion that is attached with or otherwise operationally coupled with the handlebar 201 and the pushrod 203, as shown in the braking system 200. The pushrod mount 202 may rotate the same amounts as the handlebar 201 when rotating about the longitudinal axis of the handlebar 201. For instance, the speed and the rotational amount of movement of pushrod mount 202 may be directly proportional to the speed and the rotational amount of the handlebar 201. In some other embodiments, the speed and the rotational amount of the pushrod mount 202 may not be directly proportional to the speed and the rotational amount of the handlebar 201. In some configurations, pushrod mount 202 may rotate at a speed or by an amount that is not equal to the handlebar 201.

Handlebar 201 may also comprise a bar stop 210. The bar stop 210 may be a tab or otherwise a protrusion that is attached with or otherwise operationally coupled with the handlebar 201, as shown in the braking system 200. The bar stop 210 may come to rest against its counterpart a tab or otherwise a protrusion that is attached with or otherwise operationally coupled or engaging with the stem face plate 208 or stem 204, as shown in the braking system 200. The bar stop 210 may rotate the same amounts as the handlebar 201 when rotating about the longitudinal axis of the handlebar 201. For instance, the speed and the rotational amount of movement of bar stop 210 may be directly proportional to the speed and the rotational amount of the handlebar 201. In some other embodiments, the speed and the rotational amount of the bar stop 210 may not be directly proportional to the speed and the rotational amount of the handlebar 201. In some configurations, bar stop 210 may rotate at a speed or by an amount that is not equal to the handlebar 201. Furthermore, the rotation of the bar stop 210 may also be restricted by the stem face 208 when rotating about the longitudinal axis of the handlebar 201. For example, upper and lower portions of the stem face plate 208 may dictate how much the bar stop 210 can rotate in clockwise and/or counterclockwise directions. The bar stop 210 ensures that the handlebar 201 does not rotate beyond a predetermined rotational range. In some configurations, the predetermined rotational range of the handle bar 201 may be adjustable by the operator via adjusting a corresponding stop in the stem faceplate 208. The handlebar 201 may also comprise a bearing 207, which allows the handlebar 201 to freely rotate along a predetermined axis, as described in FIG. 2.

Figure 3:
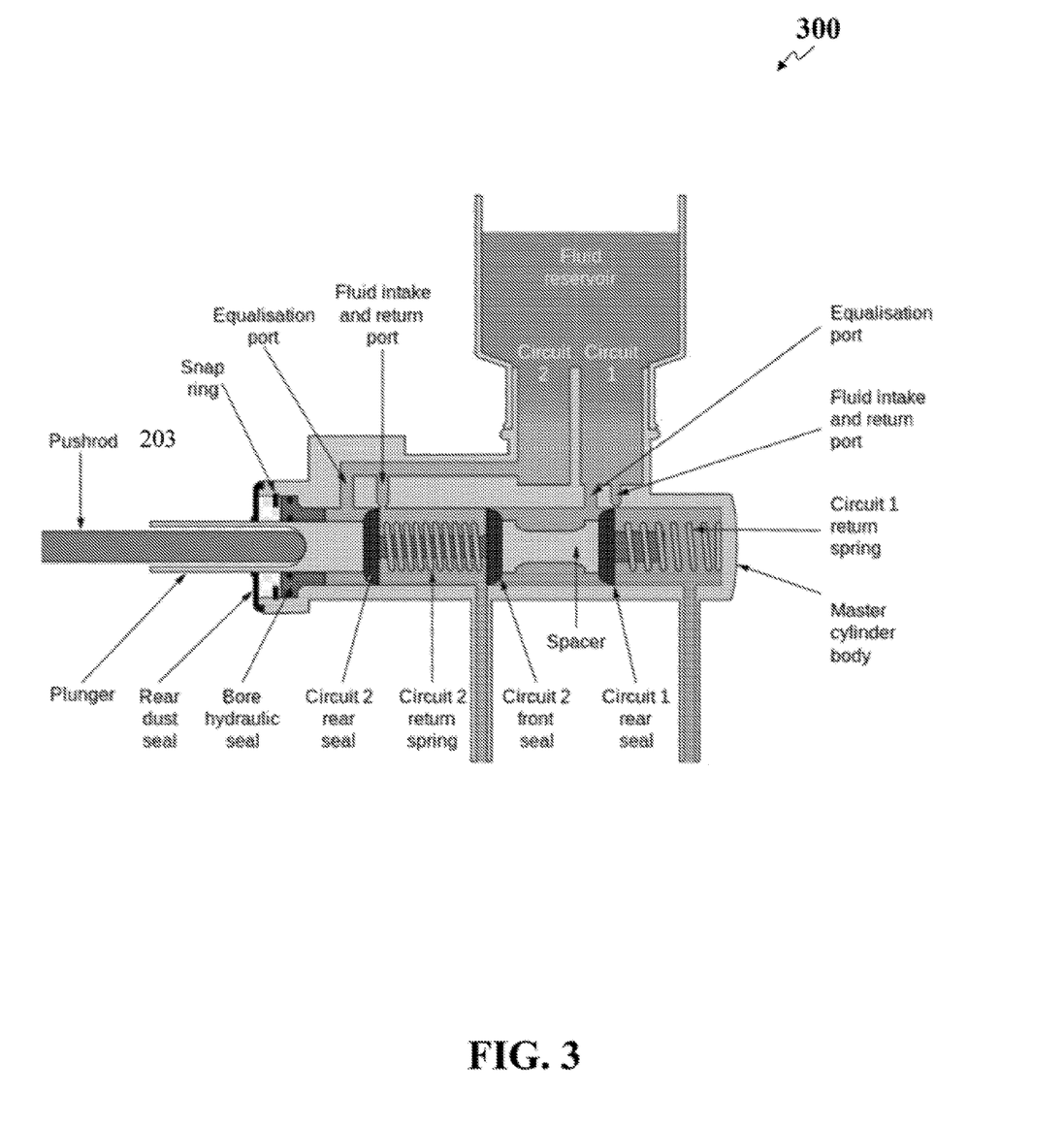
FIG. 3 illustrates an internal fluid reservoir for a hydraulic braking system 300, in accordance with an embodiment.

When the handlebar 201 is moved consistent with the braking rotation 209 when rotating about the longitudinal axis of the handlebar 201, the pushrod mount 202 is also moved consistent with the movement of handlebar 201. As a result, the pushrod 203 is moved. The pushrod 203 then actuates the bicycle's hydraulic braking system to reduce the speed of the bicycle. The hydraulic system, in some embodiments, may include a master cylinder with internal fluid reservoir 205, which may be housed within the stem 204. The internal fluid reservoir 205 may also have a reservoir cover 206. The master cylinder with internal fluid reservoir 205 is further described in FIG. 3. In some configurations, the master cylinder with internal fluid reservoir, as depicted in FIG. 3, may be a part of an auxiliary and/or an external braking system. For instance, the master cylinder and internal fluid reservoir (or any other part of the hydraulic braking system) may be housed within the stem 204. However, in some other configurations, the master cylinder and/or internal fluid reservoir (or any other part of the hydraulic braking system) may be housed externally within or fixed to other parts of the bicycle. In those configurations, the braking system 200 may activate the external and/or auxiliary hydraulic braking system via a pushrod, cable, or other linkage in order to reduce the bicycle's speed.

In some embodiments, the master cylinder with internal fluid reservoir 205 may be a part of the bicycle's existing hydraulic braking system. A hydraulic braking system is an arrangement of braking mechanism, which uses brake fluid, contained within the fluid reservoir 205 and brake lines, to transfer or exert force to one or more brake pads, or other braking mechanisms to reduce the bicycle's speed. The hydraulic braking system may be actuated when the pushrod 203 is moved. Therefore, as described above, a rider can actuate an existing hydraulic braking system of a bicycle by rotationally moving the handlebars 201, which in turn actuate the pushrod mount 202, which in turn actuates the pushrod 203 cable or other linkage, which in turn actuates the master cylinder and/or the rest of the hydraulic braking system.

As described above, the master cylinder with internal fluid reservoir may be housed within the stem 204 or any other part of the bicycle (e.g., external hydraulic braking system). In either embodiment the braking system 200 may use a pushrod, such as pushrod 203 for internal hydraulic braking systems, or other pushrods or cables for external hydraulic braking components to actuate the hydraulic braking system.

In some configurations, braking system 100 and/or braking system 200 may be combined with other existing braking systems (e.g., caliper, pneumatic, hydraulic) of a bicycle. For example, a bicycle may have a pedal rear brake in conjunction with the braking systems described above as the front brake system. Combining different braking systems may be beneficial, for example, for children as they have the leg strength to brake pedals that only work the rear wheel but insufficient finger strength to actuate a conventional front brake lever. The braking systems described herein may also be incorporated into other braking systems, such as pushrod braking systems. For instance, the braking systems described above can be used to exert force on a plate or pad, which then in turn exerts force onto a tire of a bicycle to create braking resistance. In another example, the braking systems described above can be used to exert force onto a brake pad that is pulled against an inner, side or outer surface of a rim of a front or rear wheel to create braking resistance.

The braking systems described herein may also be used for pedal-less bicycles (e.g., kick bikes). Using the braking systems described herein, children may learn to brake before they learn to pedal/propel themselves. This method of instruction is especially valuable because currently, children have to learn to brake as well as pedal at the same time, which is overwhelming in a learning sense.

The braking systems described herein may be incorporated into a retroactive kit (e.g., container) including different components and parts described herein. Upon purchase of the retroactive kit, a user may install the braking systems described herein. In some configurations, the retroactive kit may be used in conjunction with a bicycle's existing braking system. In some other configurations, the retroactive kit may be used as a replacement to a bicycles braking system.

In this disclosure, the corresponding structures, materials, acts, and equivalents of all means or step plus function elements in the claims below, if any, are intended to include any structure, material, or act for performing the function in combination with other claimed elements as specifically claimed. Note that the scope of the present disclosure is defined by the claims, which includes known equivalents and unforeseeable equivalents at the time of filing of the present disclosure. This disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure.

What is claimed is:

1. A device, comprising:
   a handlebar having a longitudinal axis, wherein the handlebar includes a first portion and a second portion;
   a stem hosting the handlebar such that the first portion extends from the stem in a first direction and the second portion extends from the stem in a second direction, wherein the first direction is opposite the second direction;
   a seat coupled to the handlebar;
   a line coupled to the seat; and
   a brake coupled to the line, wherein the first portion and the second portion are simultaneously rotatable about the longitudinal axis relative to the stem such that the seat moves and thereby controls the brake via the line.

2. The device of claim 1, further comprising:
   a stop coupled to the handlebar such that the stop controls how much the handlebar rotates about the longitudinal axis.

3. The device of claim 1, further comprising:
   a face plate engaging the stem such that the handlebar extends between the stem and the face plate, wherein the handlebar rotates about the longitudinal axis relative to the face plate.

4. The device of claim 1, further comprising:
   a bearing via which the handlebar rotates about the longitudinal axis relative to the stem.

5. The device of claim 4, wherein the handlebar rotates about the longitudinal axis inside the stem via the bearing.

6. The device of claim 1, wherein the line is a cable.

7. A device, comprising:
   a handlebar having a longitudinal axis, wherein the handlebar includes a first portion and a second portion;
   a stem hosting the handlebar such that the first portion extends from the stem in a first direction and the second portion extends from the stem in a second direction, wherein the first direction is opposite the second direction;
   a mount coupled to the handlebar;
   a rod coupled to the mount; and
   a brake coupled to the rod, wherein the first portion and the second portion are simultaneously rotatable about the longitudinal axis relative to the stem such that that the mount moves and thereby controls the brake via the rod.

8. The device of claim 7, further comprising:
   a stop coupled to the handlebar such that the stop controls how much the handlebar rotates about the longitudinal axis.

9. The device of claim 7, further comprising:
   a face plate engaging the stem such that the handlebar extends between the stem and the face plate, wherein the handlebar rotates about the longitudinal axis relative to the face plate.

10. The device of claim 7, further comprising:
    a bearing via which the handlebar rotates about the longitudinal axis relative to the stem.

11. The device of claim 10, wherein the handlebar rotates about the longitudinal axis inside the stem via the bearing.

12. The device of claim 7, further comprising:
    a fluid reservoir, wherein the brake is coupled to the rod via the fluid reservoir such that the fluid reservoir enables control of the brake via the rod.

13. The device of claim 12, wherein the fluid reservoir is housed within the stem.

14. The device of claim 7, further comprising:
    a fluid reservoir, wherein the brake is coupled to the rod via the fluid reservoir such that the fluid reservoir enables control of the brake via the rod.

* * * * *

UNITED STATES PATENT AND TRADEMARK OFFICE
CERTIFICATE OF CORRECTION

Page 1 of 1

PATENT NO. : 12,151,776 B2
APPLICATION NO. : 17/291156
DATED : November 26, 2024
INVENTOR(S) : Michael Robert Kerschbaumer It is certified that error appears in the above-identified patent and that said Letters Patent is hereby corrected as shown below:

On the Title Page

Item (65), please insert:
-- Related U.S. Application Data
(60) Provisional application No. 62/756,656, filed on November 1, 2019 --

Signed and Sealed this
Eleventh Day of November, 2025

John A. Squires
*Director of the United States Patent and Trademark Office*